United States Patent
Nakamura

(10) Patent No.: US 11,711,608 B2
(45) Date of Patent: Jul. 25, 2023

(54) INFORMATION PROCESSING APPARATUS, INFORMATION PROCESSING METHOD, PROGRAM, AND INFORMATION PROCESSING SYSTEM FOR CHANGING A CORRESPONDENCE RELATIONSHIP

(71) Applicant: Sony Group Corporation, Tokyo (JP)

(72) Inventor: Hitoshi Nakamura, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 17 days.

(21) Appl. No.: 17/223,992

(22) Filed: Apr. 6, 2021

(65) Prior Publication Data
US 2021/0227123 A1  Jul. 22, 2021

Related U.S. Application Data

(63) Continuation of application No. 16/669,238, filed on Oct. 30, 2019, now Pat. No. 10,992,850, which is a
(Continued)

(30) Foreign Application Priority Data

Aug. 30, 2011 (JP) .................................. 2011-187752

(51) Int. Cl.
*H04N 23/66* (2023.01)
*H04N 1/00* (2006.01)
(Continued)

(52) U.S. Cl.
CPC ......... *H04N 23/66* (2023.01); *H04N 1/00411* (2013.01); *H04N 23/62* (2023.01);
(Continued)

(58) Field of Classification Search
CPC ........... H04N 5/23203; H04N 1/00411; H04N 5/23206; H04N 5/23216; H04N 5/232939; H04N 1/00413; H04N 5/23225
See application file for complete search history.

(56) References Cited

U.S. PATENT DOCUMENTS 6,002,995 A  12/1999 Suzuki et al.
6,313,875 B1  11/2001 Suga et al.
(Continued)

FOREIGN PATENT DOCUMENTS

JP  2002-314863  10/2002

OTHER PUBLICATIONS

Office Action for CN Patent Application No. 201218310436.1, dated Jun. 7, 2017, 09 pages of Office Action and 12 pages of English Translation.
(Continued)

*Primary Examiner* — Gevell V Selby
(74) *Attorney, Agent, or Firm* — Oblon, McClelland, Maier & Neustadt, L.L.P.

(57) ABSTRACT

An information processing apparatus including circuitry is provided. The circuitry is configured to transmit list information for display of a plurality of cameras on a display device, receive a selection of at least one camera from the plurality of cameras based on the transmitted list information, control transmission of image data generated by the selected at least one camera, and transmit correspondence relationship information for display of a correspondence relationship between the plurality of the cameras and a plurality of communication devices on the display device. The circuitry is configured to change the correspondence relationship between one of the plurality of the cameras and one of the plurality of communication devices. Further, the circuitry is configured to transmit list information indicating a plurality of cameras for display on a display device.

25 Claims, 11 Drawing Sheets

Related U.S. Application Data continuation of application No. 15/683,828, filed on Aug. 23, 2017, now Pat. No. 10,516,817, which is a continuation of application No. 13/591,528, filed on Aug. 22, 2012, now Pat. No. 9,781,327.

(51) Int. Cl.
  *H04N 23/62* (2023.01)
  *H04N 23/63* (2023.01)
  *H04N 23/661* (2023.01)
  *H04N 23/617* (2023.01)

(52) U.S. Cl.
  CPC ......... *H04N 23/633* (2023.01); *H04N 23/661* (2023.01); *H04N 1/00413* (2013.01); *H04N 23/617* (2023.01)

(56) References Cited

U.S. PATENT DOCUMENTS

| | | | |
|---|---|---|---|
| 6,452,612 | B1 | 9/2002 | Holtz et al. |
| 6,856,346 | B1 | 2/2005 | Kobayashi et al. |
| 6,983,419 | B1 | 1/2006 | Yonezawa et al. |
| 7,161,623 | B2 | 1/2007 | Kuno |
| 7,190,810 | B2 | 3/2007 | Tanaka et al. |
| 7,222,356 | B1 | 5/2007 | Yonezawa et al. |
| 7,373,395 | B2 | 5/2008 | Brailean et al. |
| 7,423,670 | B2 | 9/2008 | Kawai et al. |
| 7,562,381 | B2 | 7/2009 | Koga |
| 7,583,414 | B2 | 9/2009 | Kawai |
| 7,663,666 | B2 | 2/2010 | Kawai et al. |
| 8,191,006 | B2 | 5/2012 | Ohmori |
| 8,340,654 | B2 | 12/2012 | Bratton et al. |
| 9,325,770 | B2 | 4/2016 | Cho |
| 2002/0067412 | A1 | 6/2002 | Kawai |
| 2002/0075244 | A1 | 6/2002 | Tani |
| 2004/0163118 | A1 | 8/2004 | Mottur |
| 2008/0143875 | A1 | 6/2008 | Scott et al. |
| 2009/0147100 | A1* | 6/2009 | Nagamasa ............. H04N 5/247 348/222.1 |
| 2010/0304731 | A1* | 12/2010 | Bratton .............. H04N 5/23206 348/E5.042 |
| 2012/0236160 | A1 | 9/2012 | Rezek et al. |
| 2017/0075050 | A1 | 3/2017 | Yamagata et al. |
| 2020/0014833 | A1* | 1/2020 | Ezoe .................... H04N 5/2628 |

OTHER PUBLICATIONS

Non-Final Rejection for U.S. Appl. No. 13/591,528, dated Nov. 1, 2013, 08 pages.

Final Rejection for U.S. Appl. No. 13/591,528, dated Apr. 16, 2014, 11 pages.

Office Action for CN Patent Application No. 2012103104361, dated Jun. 7, 2017, 09 pages of Office Action and 12 pages of English Translation.

Office Action for CN Patent Application No. 201210310436.1, dated Oct. 8, 2016, 8 pages of Office Action and 5 pages of English Translation.

Notice of Allowance and Fees Due (PTOL-85) for U.S. Appl. No. 13/591,528, dated Jun. 2, 2017, 07 Pages.

Non-Final Rejection for U.S. Appl. No. 13/591,528, dated Jan. 13, 2017, 06 pages.

Final Rejection for U.S. Appl. No. 13/591,528, dated Mar. 24, 2016, 09 pages.

Non-Final Rejection for U.S. Appl. No. 13/591,528, dated Jul. 30, 2015, 10 pages.

Final Rejection for U.S. Appl. No. 13/591,528, dated Dec. 4, 2014, 11 pages.

Non-Final Rejection for U.S. Appl. No. 13/591,528, dated Jun. 19, 2014, 10 pages.

\* cited by examiner

FIG. 7

| RCP ID | CAMERA ID |
|--------|-----------|
| 1 | 1 |
| 2 | 2 |
| 3 | 3 |
| 4 | X |
| ... | ... |

VALUE IS CHANGED IN RESPONSE TO USER OPERATION RELATED TO CAMERA SELECT

INFORMATION PROCESSING APPARATUS, INFORMATION PROCESSING METHOD, PROGRAM, AND INFORMATION PROCESSING SYSTEM FOR CHANGING A CORRESPONDENCE RELATIONSHIP

CROSS-REFERENCE TO RELATED APPLICATIONS

The present application is a continuation application of U.S. patent application Ser. No. 16/669,238, filed on Oct. 30, 2019, which is a continuation application of U.S. patent application Ser. No. 15/683,828, filed Aug. 23, 2017, now U.S. Pat. No. 10,516,817 issued on Dec. 24, 2019, which is a continuation application of U.S. patent application Ser. No. 13/591,528, filed Aug. 22, 2012 now U.S. Pat. No. 9,781,327, which claims the benefit of priority from prior Japanese Patent Application JP 2011-187752, filed Aug. 30, 2011. Each of the above-referenced applications is hereby incorporated herein by reference in its entirety.

BACKGROUND

The present disclosure relates to an information processing apparatus, an information processing method, a program, and an information processing system.

A digital camera which is configured to convert an optical image for a subject into electrical signals by an image pickup device and to store the electrical signals in an external storage medium has come into widespread use by the general public. In recent years, with the development of information processing technique, it has become possible to directly connect the digital camera with an interface such as a keyboard, a mouse, or a projector and thus to operate the digital camera via the interface (for example, see Japanese Patent Application Laid-open No. 2002-314863).

SUMMARY

However, the digitization of image pickup devices represented by still cameras or video cameras has been taking place in not only an image pickup device for the general public use but also an image pickup device for the business (broadcast) use. When an image pickup device is used for the business (broadcast) use, in numerous instances, there is provided with a remote controller configured to remotely operate a camera main body for practically capturing a subject. A user can operate a variety of buttons, levers, knobs, or the like provided in the remote controller, thereby controlling the image pickup conditions of a relevant camera main body.

For example, when a program for television broadcasting is produced, since a plurality of image pickup devices for broadcasting is often employed, the number of the remote controller to be provided will become increased accordingly. The master setup unit implemented in hardware has been used to centrally manage the configuration of such plurality of image pickup devices and remote controllers.

On the other hand, with the development of information processing technique, the attempt for controlling a camera main body or remote controller by software has been considered, by realizing functions of the master setup unit implemented in hardware by software and then executing the software in an information processing apparatus such as a personal computer. However, when a user intends to control a camera main body by operating an input device such as a keyboard or mouse connected to the information processing apparatus on which software is executed, since the user is familiar with the existing way of controlling a camera main body by using the remote controller implemented in hardware, the user feels uncomfortable in operability of software, thereby causing the occurrence of degradation of operability. Therefore, it has been desired to control a camera main body without impairing operability, even when a camera main body is managed and controlled by using an external device such as a personal computer.

In light of the foregoing, it is desirable to provide an information processing apparatus, an information processing method, a program, and an information processing system, capable of controlling a plurality of image pickup devices without impairing operability.

According to an embodiment of the present disclosure, there is provided an information processing apparatus which includes a correspondence relationship information change unit for changing correspondence relationship information indicating each correspondence relationship between a plurality of image pickup devices and a plurality of controllers, the image pickup devices and the controllers are associated with each other, the controller is used to operate at least one of the plurality of image pickup devices, and the controller is capable of operating the image pickup device associated with the controller.

According to an embodiment of the present disclosure, there is provided an information processing method which includes changing correspondence relationship information indicating each correspondence relationship between a plurality of image pickup devices and a plurality of controllers, the image pickup devices and the controllers are associated with each other, the controller is used to operate at least one of the plurality of image pickup devices, and the controller is capable of operating the image pickup device associated with the controller.

According to an embodiment of the present disclosure, there is provided a program for causing a computer to realize a correspondence relationship information change function for changing correspondence relationship information indicating each correspondence relationship between a plurality of image pickup devices and a plurality of controllers, the image pickup devices and the controllers are associated with each other, the controller is used to operate at least one of the plurality of image pickup devices, and the controller is capable of operating the image pickup device associated with the controller.

According to an embodiment of the present disclosure, there is provided an information processing system which includes a plurality of image pickup devices, a plurality of controllers for operating at least one of the plurality of image pickup devices, and an information processing apparatus described above.

According to the embodiments of the present disclosure, correspondence relationship information indicating each correspondence relationship between a plurality of image pickup devices and a plurality of controllers for operating at least one of the plurality of image pickup devices can be changed.

According to the embodiments of the present disclosure described above, it is possible to control a plurality of image pickup devices without impairing operability, thereby improving user's convenience.

BRIEF DESCRIPTION OF THE DRAWINGS

FIG. 7 is a diagram illustrating an example of correspondence relationship information indicating a correspondence relationship between a camera and a remote control panel according to the first embodiment of the present disclosure;

DETAILED DESCRIPTION OF THE EMBODIMENT(S)

Figure 1:
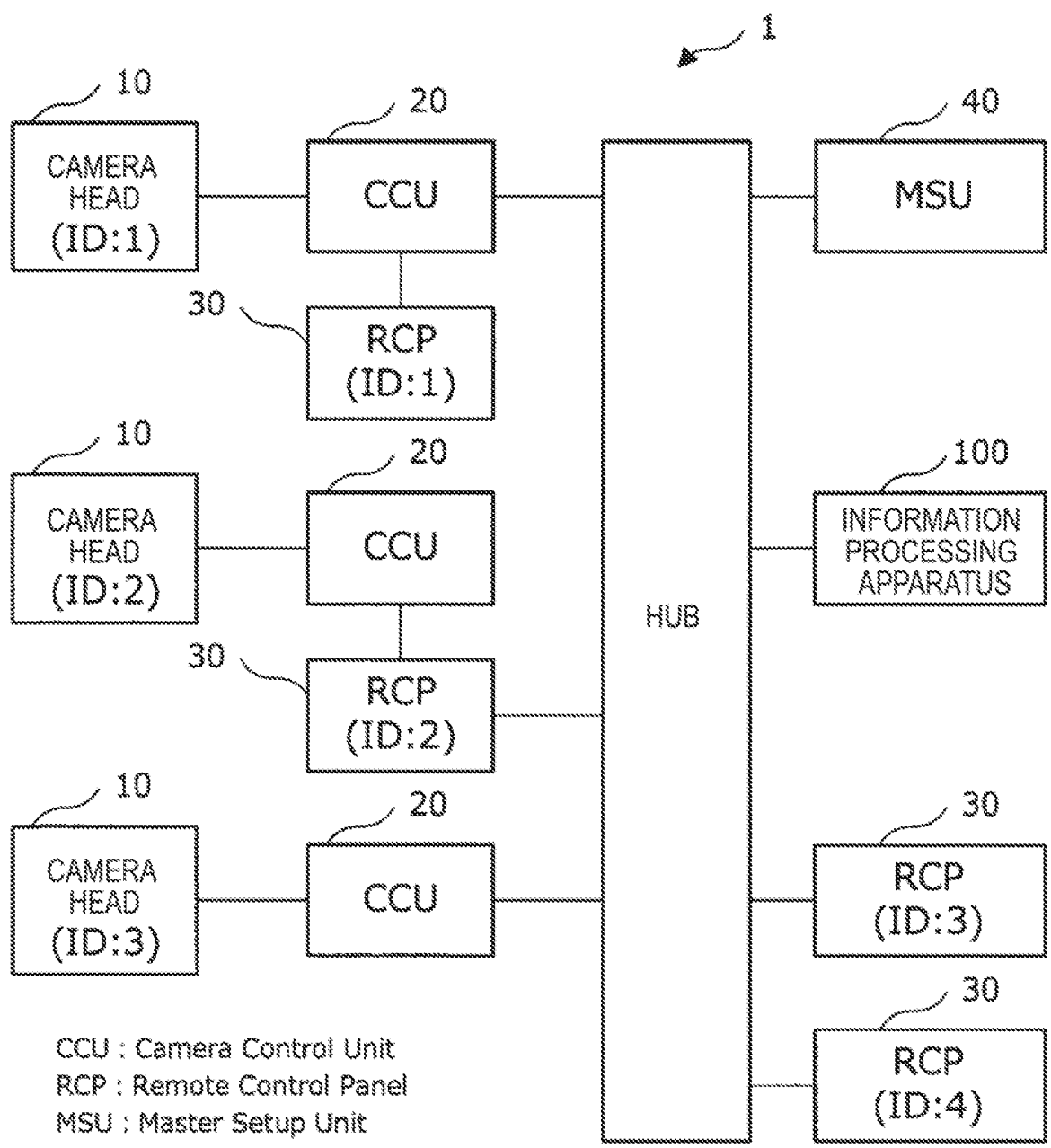
FIG. 1 is a diagram illustrating an example of an information processing system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted. Embodiments of the present disclosure will be described. In addition, the description will be made in the following order.
1. First Embodiment
1-1. Information Processing System
1-2. Remote Control Panel
1-3. Information Processing Apparatus
1-4. Procedure of Process in Remote Control Panel
1-5. Information Processing Method
2. Hardware Configuration of Information Processing Apparatus according to the embodiment of the present disclosure

First Embodiment

<Information Processing System>

An information processing system 1 according to the first embodiment of the present disclosure will be briefly described with reference to FIG. 1. FIG. 1 illustrates an example of the information processing system according to the embodiment. An image pickup device control system which is configured to include an image pickup device for broadcasting will be described below.

The information processing system 1 according to the present embodiment mainly includes a plurality of camera heads 10, a plurality of camera control units (CCUs) 20, a plurality of remote control panels (RCPs) 30, a master setup unit (MSU) 40, and an information processing apparatus 100.

The camera head 10 is an image pickup device for broadcasting which is used to capture a subject. The camera head 10 may be a studio camera mounted on a camera pedestal, and also may be so-called shoulder mount cameras such as those used for carrying on a cameraman's shoulder. The camera head 10 is connected to the camera control unit 20 (to be further described later) by a connection cable such as a triaxial cable or an optical fiber.

The camera control unit (CCU) 20 is a device for remotely controlling the exposure, image quality or the like of each camera head 10. The camera control unit (CCU) 20 can transmit a high quality image data to a desired apparatus. The image data is a subject-related image data generated in the camera head 10. Identification information (for example, an ID number) for specifying a camera head 10 controlled by a CCU 20 is assigned to the CCU 20. The CCUs 20 are connected to both the master setup unit 40 (to be described later) and the information processing apparatus 100 via a hub, thereby enabling the CCUs 20 to communicate with the master setup unit 40 and the information processing apparatus 100. Alternatively, the CCU 20 may be indirectly connected to both the master setup unit 40 and the information processing apparatus 100 via the remote control panels 30 (to be described later).

The CCU 20 also may be directly connected to the remote control panel 30 through a predetermined cable or may be indirectly connected to the remote control panel 30 via a hub. The remote control panel 30 is used to remotely control the exposure or image quality of each corresponding camera head 10.

The remote control panel (RCP) 30 is a device used to remotely operate each camera head 10 from a remote location such as an operating room of a studio. Typically, each of the RCP 30 is associated with corresponding one of the camera head 10 located in the information processing system 1 (more specifically, an RCP connected to a CCU is associated with a camera head which is controlled by the CCU connected to the RCP). The RCP 30 can control the exposure or image quality of the associated camera head 10. Identification information (for example, an ID number) is used to specify the RCP 30.

The master setup unit (MSU) 40 is a control panel which is used to remotely operate the exposure or image quality of each of a plurality of camera heads 10 connected to the information processing system 1 via the CCUs 20 associated with each camera head 10. The MSU 40 can centrally manage an operating status of a plurality of camera heads 10 or RCPs 30 which are connected to the information processing system 1. The MSU 40 is used to control the image quality of a camera by a user often called a video engineer when operation or maintenance is performed.

As described above, an RCP 30 typically can control a camera head 10 physically connected to the RCP 30 by a connection cable and so on. In the example shown in FIG. 1, the RCP 30 to which "1" is assigned as an identification number (ID=1) can control the camera head 10 assigned as ID=1. The RCP 30 assigned as ID=2 can control the camera head 10 assigned as ID=2. However, if there is a mechanism for changing one camera head 10 controllable by an RCP 30 into another camera head 10 controllable by the RCP 30 without changing a physical connection, then a user can make effective use of the system as shown in FIG. 1. Thus, the MSU 40 has an ability (RCP assignment function) to change a camera head controllable by an RCP 30 into another while maintaining a physical connection relationship as shown in FIG. 1.

By using the RCP assignment function, in the example shown in FIG. 1, it is possible to change the camera head 10 remotely operable by the RCP 30 assigned as ID=1 into the camera head 10 assigned as ID=2. As a result, it is possible to operate the camera head assigned as I1=2 using the RCP 30 assigned as ID=1.

However, since the RCP assignment function implemented in the MSU 40 sets the correspondence relationship between camera heads and RCPs while maintaining physical connections, in the example described above, the RCP 30 of ID=1 associated with the camera head 10 of ID=2 may not operate the camera head 10 of ID=1 during maintaining the above-described setting.

Therefore, in the information processing system 1 according to the embodiment, an information processing apparatus 100 (described further below) is included in an image pickup processing system having the camera head 10, the CCU 20, the RCP 30, and the MSU 40. By including the information processing apparatus 100, in the information processing system 1 according to the embodiment, it is possible to dynamically change the correspondence relationship between the camera head 10 and the RCP 30 by operating a graphical user interface (GUI) of the information processing apparatus 100.

The information processing apparatus 100 is an apparatus which serves as a MSU by executing software (hereinafter referred to as "MSU software") implementing the function of the MSU 40 capable of individually managing and controlling a plurality of camera heads 10. The execution of software is implemented by a CPU and so on included in the information processing apparatus 100. The information processing apparatus 100 may control the entire system on behalf of the MSU 40, in cooperation with the MSU 40, or by assisting the MSU 40. The information processing apparatus 100 may be any suitable type of computer such as a desktop or notebook that is capable of executing the MSU software regardless of its shape or function.

A variety of information such as settings and operating status of camera heads in the system can be displayed in the form of a list on a screen of the information processing apparatus 100 by implementing the function of the MSU as software. The display of information is done by using the GUI having a high degree of freedom. Thus, user's convenience is improved. In addition, in the MSU 40 implemented as hardware, its throughput is limited by the throughput of a microprocessor incorporated in the hardware. However, it is possible to utilize the full CPU power of the information processing apparatus 100 and to improve its throughput by implementing the function of the MSU as software.

In addition, as described above, the information processing apparatus 100 executing the MSU software dynamically changes a correspondence relationship between the camera head 10 and the RCP 30 by the operation of GUI, and the information processing apparatus 100 has a function of causing the RCP 30 implemented by hardware to follow the operation by software (the function is hereinafter referred to as "RCP Linkage function").

As described below, the RCP Linkage function is a function that relates an RCP 30 to the RCP Linkage function beforehand, when a camera head 10 to be operated through the GUI is selected, it allows the camera head 10 selected through the GUI to be operable by the RCP 30 associated with the RCP Linkage function. In this case, the GUI is a type of software. As an example shown in FIG. 1, when the RCP 30 of ID=4 is associated with the RCP Linkage function and the camera head 10 of ID=1 is selected through the GUI of the information processing apparatus 100, it is possible to operate the camera head 10 by the RCP 30 of ID=4. Subsequently, when the camera head 10 of ID=3 is selected through the GUI of the information processing apparatus 100, it is possible to operate the camera head 10 of ID=3 by the RCP 30 of ID=4.

With implementing this RCP Linkage function, when any one RCP 30 located in the vicinity of the information processing apparatus 100 is associated with the RCP Linkage function, it is possible to operate a camera head 10 to be operated by the adjacent RCP 30 by selecting the camera head 10 to be operated through the GUI of the information processing apparatus 100. This enables a user to effectively control a camera head 10, without moving the camera head 10 to be operated to the remote controllable location of an RCP 30 and then operating the camera head 10. In addition, the user can use a more familiar hardware having buttons or the like suitable for the control of camera head 10, thereby maintaining and improving operability of the system.

Hereinbefore, the information processing system 1 according to the embodiment has been briefly described with reference to FIG. 1.

<Remote Control Panel>

Figure 2:
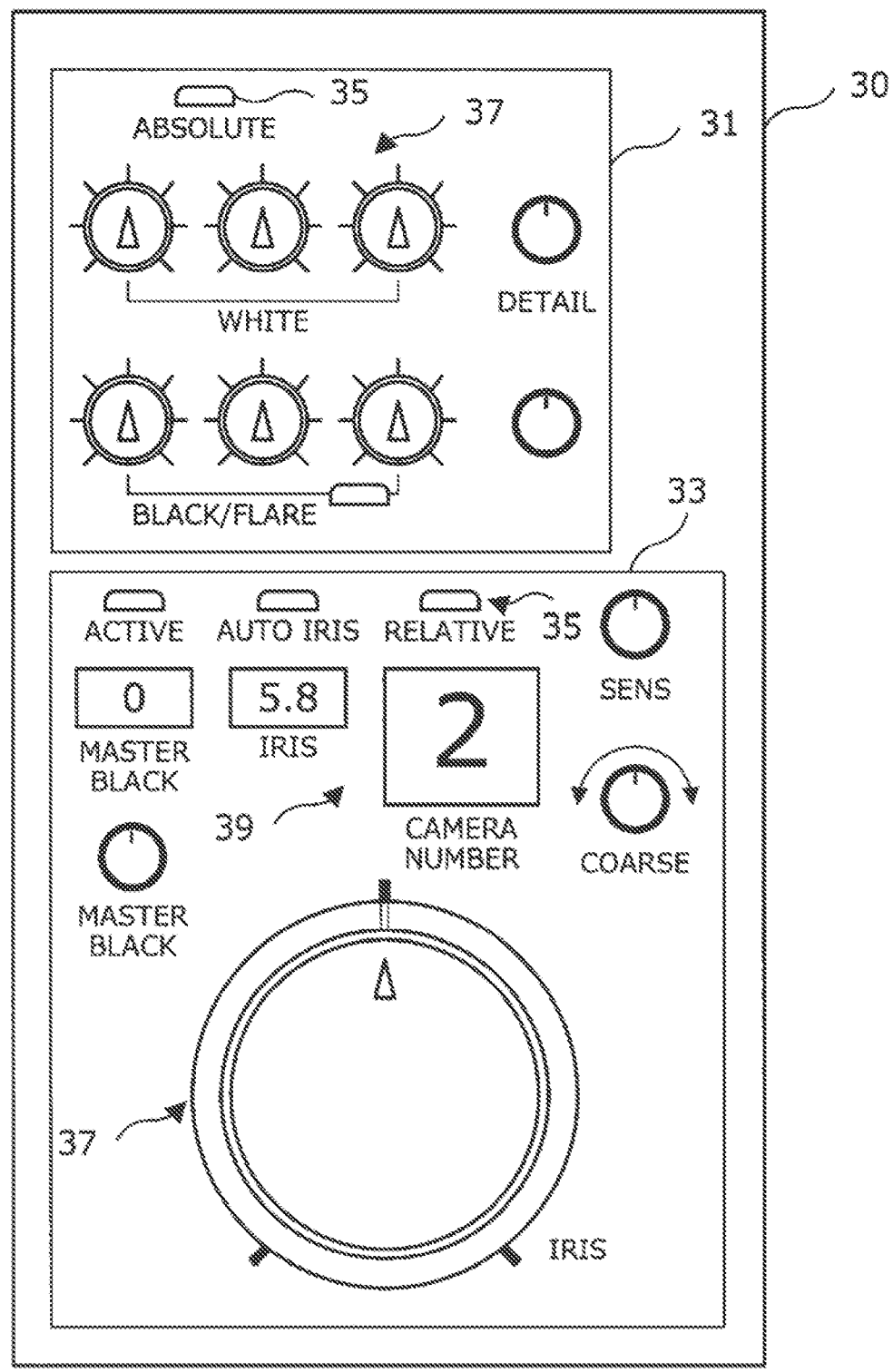
FIG. 2 is a diagram illustrating an external appearance of a remote control panel according to the first embodiment of the present disclosure.
Figure 3:
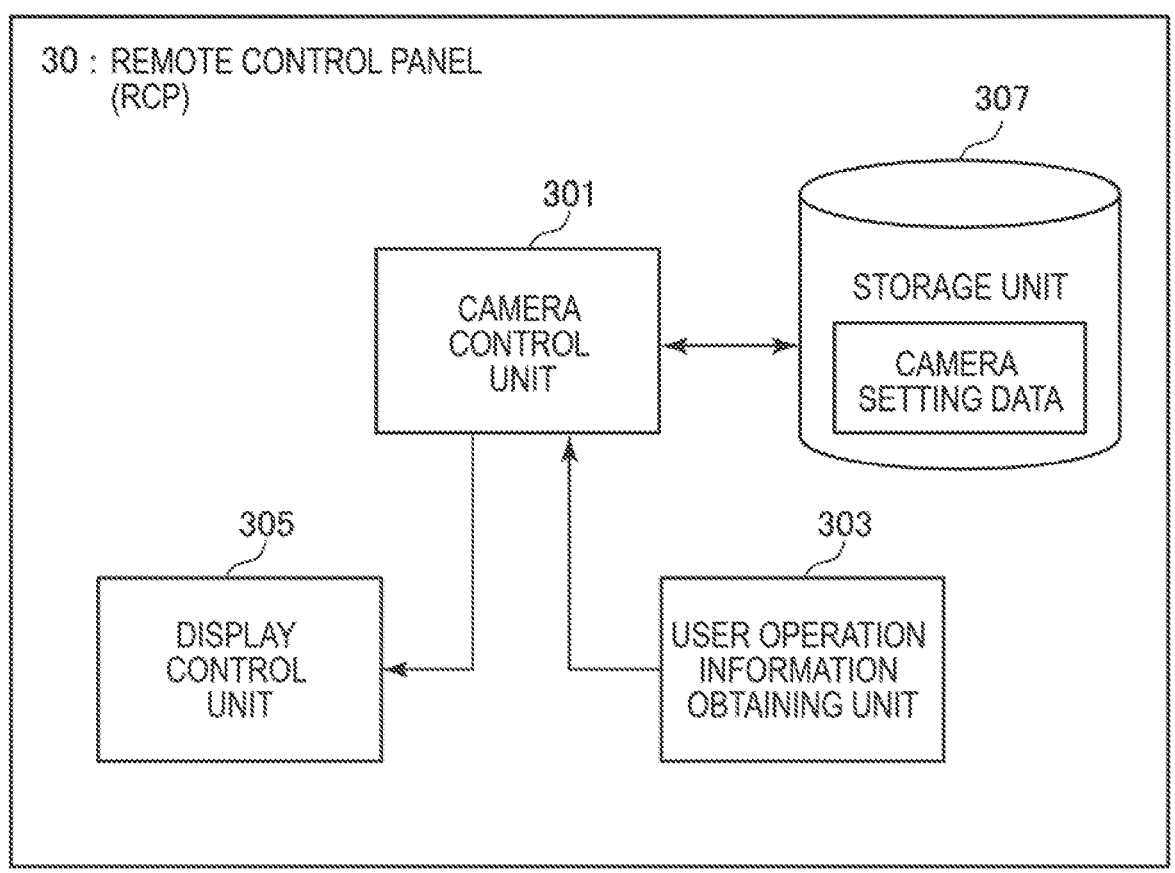
FIG. 3 is a block diagram illustrating the configuration of the remote control panel according to the first embodiment of the present disclosure.

Next, prior to describing the information processing apparatus 100 according to the embodiment, the remote control panel 30 will be briefly described with reference to FIG. 2 and FIG. 3. FIG. 2 is a diagram illustrating an external appearance of the remote control panel 30 according to the embodiment. FIG. 3 is a block diagram illustrating an exemplary configuration of the remote control panel 30 according to the embodiment.

The remote control panel (RCP) 30 is a hardware used to control the exposure or image quality of a camera head 10. The RCP 30 is provided with a variety of buttons, knobs, or the like used to control the exposure or image quality of a camera head 10, as shown by the external appearance of FIG. 2.

Each of the RCPs 30 may include an image quality adjusting operation unit 31 and an exposure adjusting operation unit 33, as shown in FIG. 2. The image quality adjusting operation unit 31 is configured to control the conditions for determining the image quality of white balance, black balance, flare balance, and so on. The exposure adjusting operation unit 33 is configured to control the conditions used to decide the iris (aperture) and exposure of the camera head 10.

The user can control the exposure or image quality of a camera head 10 by operating buttons 35 or knobs 37 with reference to configuration details (for example, the number of an operable camera head 10 or a preset value of iris) displayed on a display panel 39.

Each of the RCPs 30 mainly includes a camera control unit 301, a user operation information obtaining unit 303, a display control unit 305, and a storage unit 307, as shown in FIG. 3.

The camera control unit 301 is implemented by a CPU (Central Processing Unit), a ROM (Read Only Memory), a RAM (Random Access Memory), a communication device, and so on. The camera control unit 301 is a processing unit which realizes camera head control function included in the RCP 30.

The camera control unit 301 refers to correspondence relationship information related to the correspondence relationship between a camera head 10 and an RCP 30 on a regular basis. The correspondence relationship information is stored in the MSU 40 or the information processing apparatus 100 (further described later). The camera control unit 301 decides which one of camera heads 10 can be operated by the RCP 30. The camera control unit 301 applies information to camera setting data stored in the storage unit 307 (further described later) or the like. The information is related to the camera head 10 operable by the RCP 30.

In addition, the camera control unit 301 generates a control signal corresponding to user operations on the basis of information indicating the details of the user operations. The user operations are notified from the user operation information obtaining unit 303 (further described later), and the user operations are performed by a user using a variety of buttons shown in FIG. 2. The camera control unit 301 then outputs the generated control signal to the camera head 10 corresponding to the RCP 30. This enables the RCP 30 to control the exposure or image quality of the camera head 10 corresponding to the itself.

In addition, the camera control unit 301 refers to the camera setting data stored in the storage unit 307 (further described later) or the like. By referring to the camera setting data, the camera control unit 301 instructs the display control unit 305 to cause the display panel 39 to display a variety of condition settings of the camera head 10 which is associated with the RCP 30.

The user operation information obtaining unit 303 is implemented by, for example, a CPU, a ROM, a RAM, and an input device. The user operation information obtaining unit 303 specifies operations (for example, operations performed by a user) and generates user operation information related to the user operation. The user operations are performed by a user using a variety of buttons 35 or knobs 37 of the RCP 30. The user operation information obtaining unit 303 then outputs the generated user operation information to the camera control unit 301.

The display control unit 305 is implemented by, for example, a CPU, a ROM, a RAM, and an output device. The display control unit 305 controls the display content of the display panel 39 provided at the RCP 30. For example, display control unit 305 causes the display panel 39 to display data such as a variety of condition settings of the camera head 10. The condition settings are notified from the camera control unit 301. This enables the user (operator) of the RCP 30 to know various conditions which are set in the camera head 10 associated with the RCP 30.

The storage unit 307 is implemented by a RAM or storage device included in the RCP 30. The storage unit 307 stores identification information therein which indicates the camera head 10 associated with the RCP 30 or stores camera setting data having a setting data or the like of the camera head 10. Also, a variety of parameters or interim reports of a process to be saved at a time when the RCP 30 according to the present embodiment performs any process, various types of database or program, or the like are appropriately recorded on the storage unit 307. The camera control unit 301, the user operation information obtaining unit 303, and a display control unit 305 can freely read and write data from and to the storage unit 307.

As described above, one example of functions performed by the remote control panel 30 according to the present embodiment has been described. The respective components described above may be configured using general purpose elements or circuits, and may be configured by hardware dedicated for the function of the respective components. Alternatively, all of the functions of the components may be performed by a CPU and the like. Accordingly, the hardware configuration to be used can be changed or modified as appropriate according to the technical level at the time of carrying out the present embodiment.

<Information Processing Apparatus>

Figure 4:
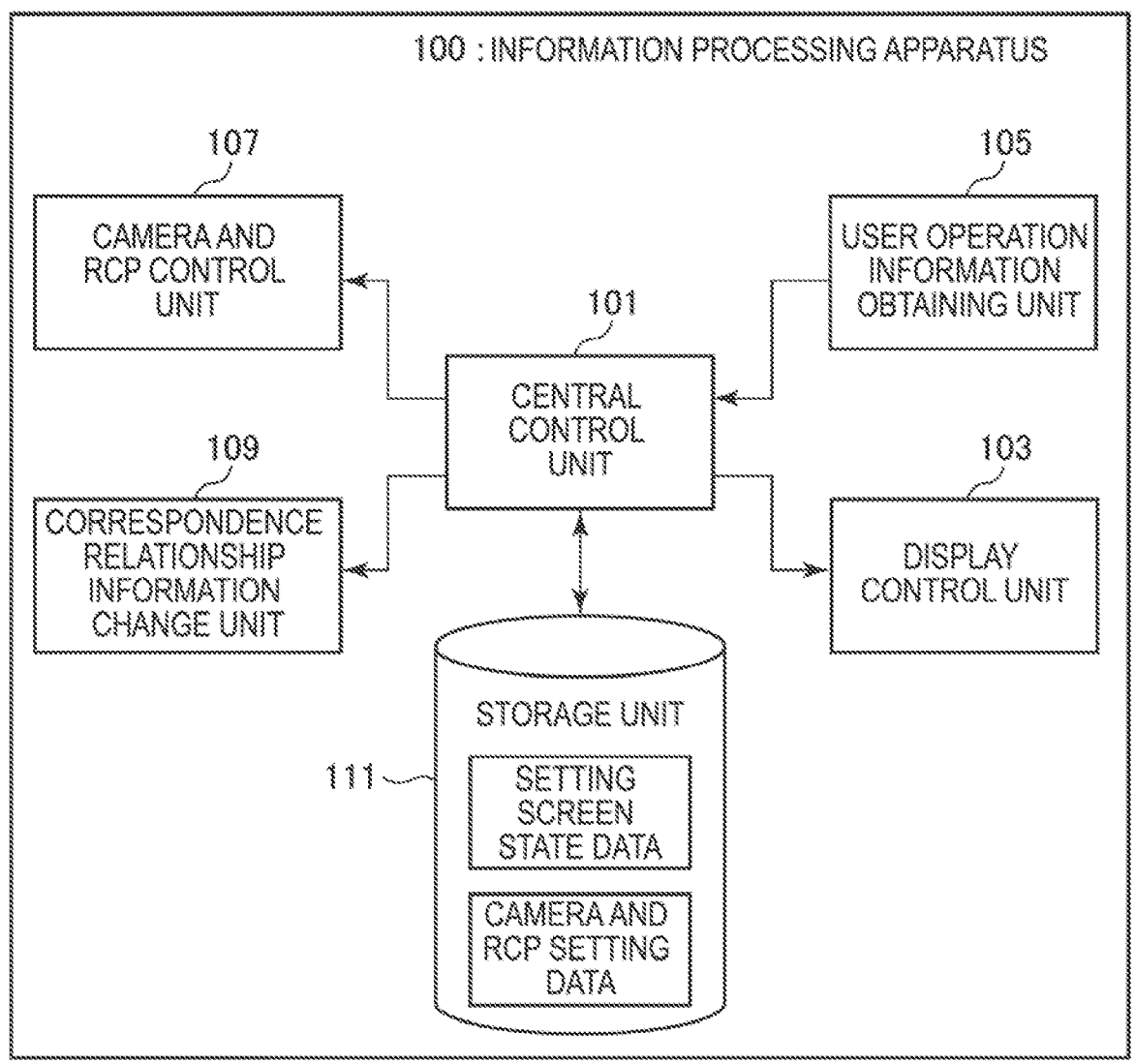
FIG. 4 is a block diagram illustrating an exemplary configuration of an information processing apparatus according to the first embodiment of the present disclosure.
Figure 5:
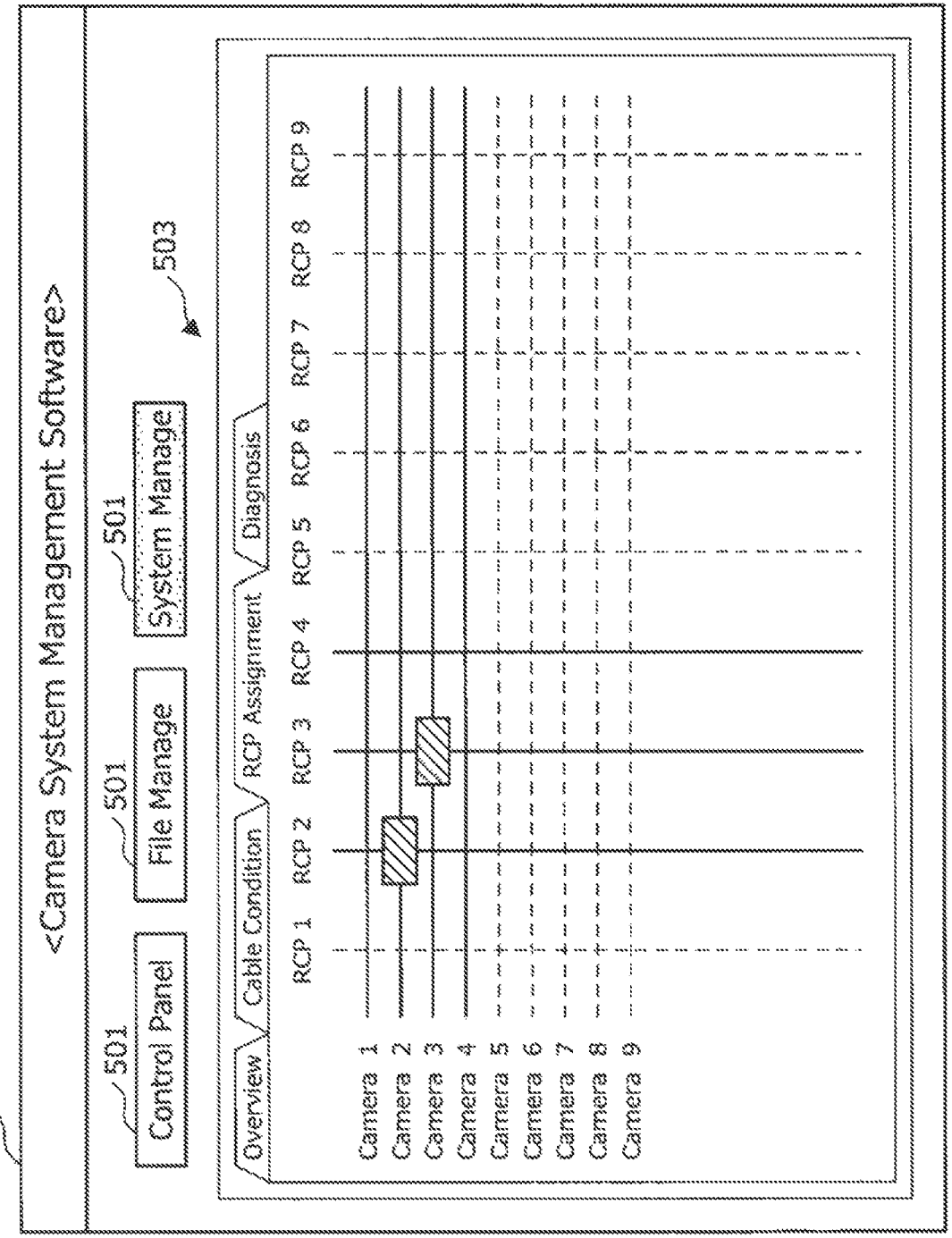
FIG. 5 is a diagram illustrating an example of a display window of the information processing apparatus according to the first embodiment of the present disclosure.
Figure 6:
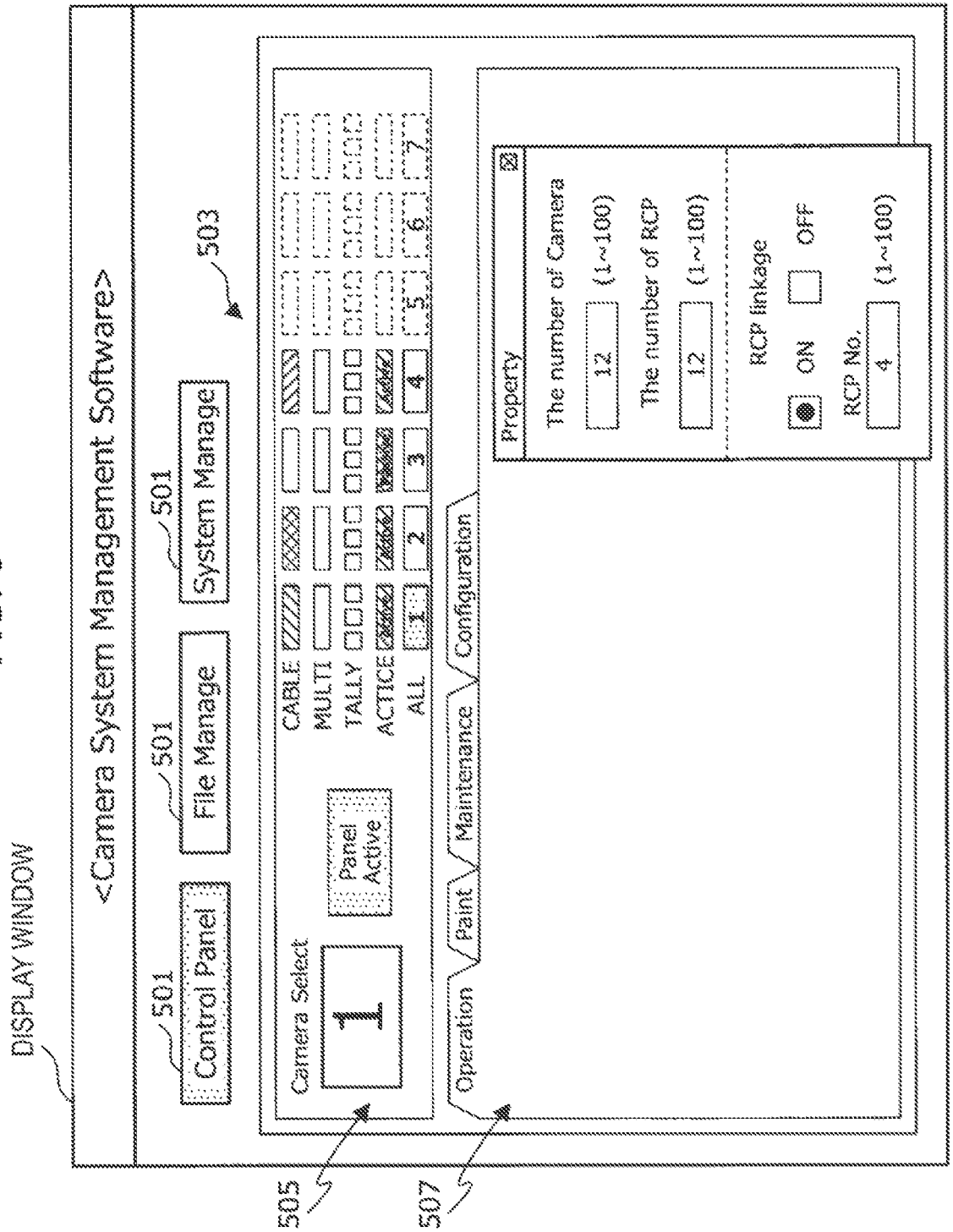
FIG. 6 is a diagram illustrating an example of a display window of the information processing apparatus according to the first embodiment of the present disclosure.

Subsequently, the information processing apparatus 100 according to the present embodiment will be described with reference to FIGS. 4 to 7. FIG. 4 is a block diagram illustrating a configuration of the information processing apparatus 100 according to the present embodiment. FIG. 5 and FIG. 6 are diagrams illustrating an example of a graphical user interface (GUI) of the information processing apparatus 100 according to the present embodiment. FIG. 7 is a diagram illustrating an example of correspondence relationship information according to the present embodiment.

The configuration of the information processing apparatus 100 according to the present embodiment will be described with reference to FIG. 4. The information processing apparatus 100 according to the present embodiment mainly includes a central control unit 101, a display control unit 103, a user operation information obtaining unit 105, a camera and RCP control unit 107, a correspondence relationship information change unit 109, and a storage unit 111, as shown in FIG. 4.

The central control unit 101 is implemented by, for example, a CPU, a ROM, a RAM, and so on. The central control unit 101 implements functions of the MSU 40 of the information processing apparatus 100 by executing MSU software which is a software implementing the function of the MSU 40. And then, the central control unit 101 controls the implemented functions of the MSU 40 in a central control manner.

FIG. 5 is a diagram illustrating an example of a GUI which is output to a display device such as a display of the information processing apparatus 100 by the MSU software executed by the central control unit 101. The functions of the MSU which is provided by the information processing apparatus 100 according to the present embodiment are divided broadly into three types of functions: an overhead view function of system, a component management function of system, and a monitoring function of system.

Specifically, the overhead view function of system is a function which allows a plurality of parameters related to any one camera head 10 to be checked or operated in a single screen, or which allows a plurality of parameters related to a plurality of camera heads 10 to be checked or operated in a table form. The component management function of system is a function which allows for the content check or simple edition of a scene file captured by a camera head 10, which allows for the filing of parameters of the camera head 10 included in the system, or which allows for the conversion of a present setting value of the system component, a content of a scene file, or a self-diagnosis result into a file having a predetermined file format such as a CSV format. The monitoring function of system is a function which allows for listing of optical levels or states of the system, which allows for setting the system, or which allows for listing of the self-diagnosis results of the system.

In the information processing apparatus 100 of the present embodiment, such three types of functions are changed from one function into another depending on the selection state of a function selection object 501 such as an icon which is displayed within a display window. In the information processing apparatus 100, GUIs related to the respective functions are displayed on a function display area 503 within the display window.

As an example shown in FIG. 5, when the object of "Control Panel" is selected, the overhead view function of system (control panel mode) is mainly provided among the three types of functions described above. Also, when the object of "File Manage" is selected, the component management function of system (file manage mode) is mainly provided among the three types of functions described above. Also, when the object of "System Manage" is selected, the monitoring function of system (system manage mode) is mainly provided among the three types of functions described above.

The control panel mode provides functions which allows for listing of a plurality of parameters of the camera head on a category-by-category basis as well as a function which allows for checking or controlling each of the camera heads. The control panel mode provides functions which allows for checking or controlling basic parameters of the camera head, a function which allows for checking or controlling paint type parameters of the camera head, a function which allows for checking or controlling a maintenance type parameter of the camera head, and a function which allows for various settings of the camera head.

In the file manage mode, files related to a camera head 10 are managed. The file manage mode provides a function for managing a scene file of a camera, a function for generating a snapshot file where each present state of all the cameras connected to the system is filed, and a function for managing a file other than the scene file.

The system manage mode provides a function for performing an overhead view of a state of the camera head connected to the system. The system manage mode provides a function for comparing or controlling by performing an overhead view of parameters of all the camera heads 10 connected to the system, a function for performing an overhead view of optical levels or cable state of the camera head 10 having an optical transmission function, a function for associating a camera head 10 or CCU 20 to be controlled with an RCP 30, and a function for providing service information such as a self-diagnosis result, model name, or serial number.

In an example shown in FIG. 5, a GUI in a case of selecting the "system manage mode" is illustrated. The system manage mode provides various functions as described above. Among them, in the illustrated example, GUI in a case of selecting a function of "RCP Assignment" is showed. The function of "RCP Assignment" associates an RCP with a camera or CCU to be controlled.

With the function of RCP Assignment, as shown in FIG. 5, the camera head 10 and RCP 30 connected to the system 1 are listed, and thus it is possible to set which one of the camera head 10 will be associated with which one of the RCP 30. In the illustrated example, the "RCP 2" is associated with the "camera head 2", and the "RCP 3" is associated with the "camera head 3".

In the GUI shown in FIG. 5, when a user operation associates a camera head 10 with an RCP 30, the central control unit 101 generates correspondence relationship information indicating a correspondence relationship between the camera head 10 with the RCP 30. The central control unit 101 may store the generated correspondence relationship information in the storage unit 111 (to be described later). The correspondence relationship information is stored as a part of camera and RCP setting data in the storage unit 111. Also, the central control unit 101 may store the generated correspondence relationship information in an external storage unit (for example, a memory provided in the MSU 40) of the information processing apparatus 100.

Furthermore, data format of the correspondence relationship information generated by the central control unit 101 is not limited to any particular format; the data format may be a format such as a lookup table or database.

Moreover, the central control unit 101 may store what kind of parameter is set in the storage unit 111 as a setting screen state data in the GUI shown in the display window.

In an example shown in FIG. 6, a GUI in a case of selecting the "control panel mode" is illustrated. When the control panel mode is selected, the central control unit 101, as shown in FIG. 6, causes the function display area 503 to display a camera selection window 505 for selecting a camera head and a control panel mode tab 507.

The central control unit 101 causes the camera selection window 505 to display a list of the camera heads 10 connected to the system. The central control unit 101 causes the control panel mode tab 507 to display a GUI which is used to set various functions performed by the control panel mode function. In addition, a GUI which will be displayed on the control panel mode tab 507 is omitted in FIG. 6.

When a user operates the GUI which is displayed on the control panel mode tab 507, information related to the user operation is notified from a user operation information obtaining unit 105 (to be described later) to the central control unit 101. The central control unit 101 causes a display control unit 103 (to be described later) to modify content which is displayed in the display window depending on the user operation, and specifies a control content corresponding to the user operation. The central control unit 101 also outputs the specified control content to a camera and RCP control unit 107 (to be described later). The camera and RCP control unit 107 generates a control signal for controlling a camera or a RCP based on the control content corresponding to the user operation notified from the central control unit 101, and then the camera and RCP control unit 107 notifies the control signal to the relevant camera or RCP. This enables the relevant camera or RCP to be controlled by the information processing apparatus 100.

The ON/OFF state of the "RCP Linkage function" as described above can be set in the control panel mode. As shown in FIG. 6, when the RCP Linkage function is set to "ON" by the user operation, the central control unit 101 allows the RCP 30 associated with the RCP Linkage function to control the camera head displayed on the camera selection window 505. For example, in the example shown in FIG. 6, the central control unit 101 associates the RCP 30 of ID=1 with the RCP Linkage function.

When a user selects a camera head in the camera selection window 505 in a state that the RCP Linkage function is set to ON, information indicating that user operation was done is notified from the user operation information obtaining unit 105 (to be described later) to the central control unit 101. When the central control unit 101 specifies which one of the camera heads has been selected by the user on the basis of the user operation information, the central control unit 101 causes the display control unit 103 (to be described later) to modify the content which is displayed on the camera selection window 505. In addition, the central control unit 101 outputs information related to the specified camera head to a correspondence relationship information change unit 109 (to be described later). The correspondence relationship information change unit 109 changes the correlation of the RCP associated with the RCP Linkage function based on the information related to camera head notified from the central control unit 101. This allows the RCP associated with the RCP Linkage function to follow the result selected by using the camera selection window 505 in the information processing apparatus 100 according to the present embodiment.

In this way, the central control unit 101 according to the present embodiment is a processing unit which centrally controls the functions as a MSU of the information processing apparatus 100.

Referring again to FIG. 4, the display control unit 103 according to the present embodiment will be described.

The display control unit 103 is implemented by, for example, a CPU, a ROM, a RAM, and an output device. The display control unit 103 controls the display screen of a display device such as a display included in the information processing apparatus 100 or a display device such as a display provided at outside the information processing apparatus 100. More specifically, the display control unit 103 controls a display screen when an execution screen of the MSU software executed by the central control unit 101 is displayed on a display device. This enables the user of the information processing apparatus 100 to easily know each state of various functions provided from the MSU software being executed by the central control unit 101.

The user operation information obtaining unit 105 is implemented by, for example, a CPU, a ROM, a RAM, and an input device. The user operation information obtaining unit 105 specifies the operation (the operation done by a user) performed for an input device such as a keyboard, mouse, or touch panel, and generates user operation information related to the user operation. The user operation information obtaining unit 105 then outputs the generated user operation information to the central control unit 101. This enables the central control unit 101 to know what kind of operation has been performed for the information processing apparatus 100 (more specifically, the MSU software being executed) by the user, thereby providing the function corresponding to the user operation to the user.

The camera and RCP control unit 107 is implemented by, for example, a CPU, a ROM, a RAM, and a communication device. The camera and RCP control unit 107 obtains information which is related to a control content corresponding to the user operation and is outputted from the central control unit 101, thereby knowing what kind of content the user operation corresponds. The camera and RCP control unit 107 then generates a control signal for controlling a camera head or an RCP based on the known control content, and outputs the generated control signal to the relevant camera head 10 or RCP 30. Thus, the operation that the user wants to perform for the camera head 10 or RCP 30 can be executed by notifying the control signal to the relevant camera head 10 or RCP 30.

The camera and RCP control unit 107 can refer to a setting screen state data or a camera and RCP setting data stored in a storage unit 111 (to be described later) as necessary when it generates the control signal corresponding to the user operation.

The correspondence relationship information change unit 109 is implemented by, for example, a CPU, a ROM, a RAM, and a communication device. The correspondence relationship information change unit 109 changes correspondence relationship information depending on the user operation. The correspondence relationship information indicates the correspondence relationship between a camera head 10 and the RCP 30 which can operate the camera head 10. The camera head 10 and the RCP 30 are associated with each other among a plurality of camera heads 10 and a plurality of RCPs 30 connected to the system.

Specifically, when the RCP Linkage function is set to ON and a camera head is selected by the user operation in the camera selection window 505 of the control panel mode shown in FIG. 6, the correspondence relationship information change unit 109 performs the following process. When the user selects a camera head 10 by operating the camera selection window 505, the central control unit 101 specifies which camera head 10 is selected among the camera heads connected to the system based on the user operation information outputted from the user operation information obtaining unit 105, and the central control unit 101 outputs the specified result to the correspondence relationship information change unit 109. The correspondence relationship information change unit 109 specifies an RCP 30 associated with the RCP Linkage function by referring to a setting screen state data or a camera and RCP setting data stored in a storage unit 111 (to be described later). The correspondence relationship information change unit 109 then changes the camera head 10 associated with the specified RCP 30 into the camera head 10 notified from the central control unit 101.

FIG. 7 is a diagram illustrating an example of the correspondence relationship information according to the present embodiment. In an example shown in FIG. 7, it is assumed that the correspondence relationship information is information where identification information (ID number) assigned to an RCP is associated with identification information (ID number) assigned to the camera head which can be operated by the RCP. In this case, when the RCP Linkage function is associated with the RCP of RCP ID=4, the correspondence relationship information change unit 109 dynamically changes the ID of the camera head corresponding to the RCP of RCP ID=4, depending on the user operation related to the camera head. The camera head operable by the RCP of RCP ID=4 can be changed whenever necessary depending on the user operation. Thus, any of the camera heads 10 can be operated by using the RCP 30 associated with the RCP Linkage function.

In this regard, the correspondence relationship information change unit 109 may change the correspondence relationship information which is stored in the MSU 40, a storage unit 111 or the like in a format such as a lookup table or database. Also, the correspondence relationship information change unit 109 may directly change the correspondence relationship information related to the information processing apparatus 100 by accessing the the camera head 10, the CCU 20, or the RCP 30 storing the correspondence relationship information.

In addition, when any one camera head 10 is associated with any one RCP 30 by using the RCP Linkage function, there may be the case where a plurality of RCPs 30 are at least temporarily associated with a single camera head 10. In this case, between the RCP 30 that has been associated previously and the RCP 30 that is associated by the RCP Linkage function, a way to decide an RCP having a higher priority over other RCP can be appropriately set in the system. In other words, the relevant camera head 10 may be controlled by the RCP 30 associated by the RCP Linkage in preference to another RCP. Also, when there is no inconsistency in the control content, the relevant camera head 10 may be controlled by both of the RCPs 30. In addition, the priority of control among a plurality of RCPs may be set based on other priority information related to the priority of RCPs.

The storage unit 111 is implemented by a RAM or other storage device included in the information processing apparatus 100. The storage unit 111 stores a setting screen state data which indicates a status of a setting screen of the MSU software, a camera and RCP setting data in which the setting of a camera or RCP is described, or the like. In addition, the correspondence relationship information described above may be stored as a part of the camera and RCP setting data. Also, the correspondence relationship information and the camera and RCP setting data may be stored separately. Also, a variety of parameters or interim reports of a process to be saved at a time when the information processing apparatus 100 according to the present embodiment performs any process, a variety of types of database or program, or the like are appropriately recorded on the storage unit 111. The central control unit 101, the display control unit 103, the user operation information obtaining unit 105, the camera and RCP control unit 107, the correspondence relationship information change unit 109 and so on can freely read and write data from and to the storage unit 111.

The exemplary functions of the information processing apparatus 100 according to the present embodiment have been described. The respective components described above may be configured using general purpose elements or circuits, and may be configured by hardware dedicated for the function of the respective components. Alternatively, all of the functions of the components may be performed by a CPU or the like. Accordingly, the configuration to be used may be changed as appropriate in accordance with the technical level in this field at the time when the present embodiment is carried out.

It is possible to make a computer program for realizing the functions of the above-described information processing apparatus according to the present embodiment, and the computer program can be installed on a personal computer and the like. Further, a computer-readable recording medium storing such computer program can be provided. Examples of the recording medium include a magnetic disk, an optical disk, a magneto-optical disk, and a flash memory. Further, the above computer program may be distributed by, for example, a network, without using the recording medium.

<Procedure of Process for Remote Control Panel>

Figure 8:
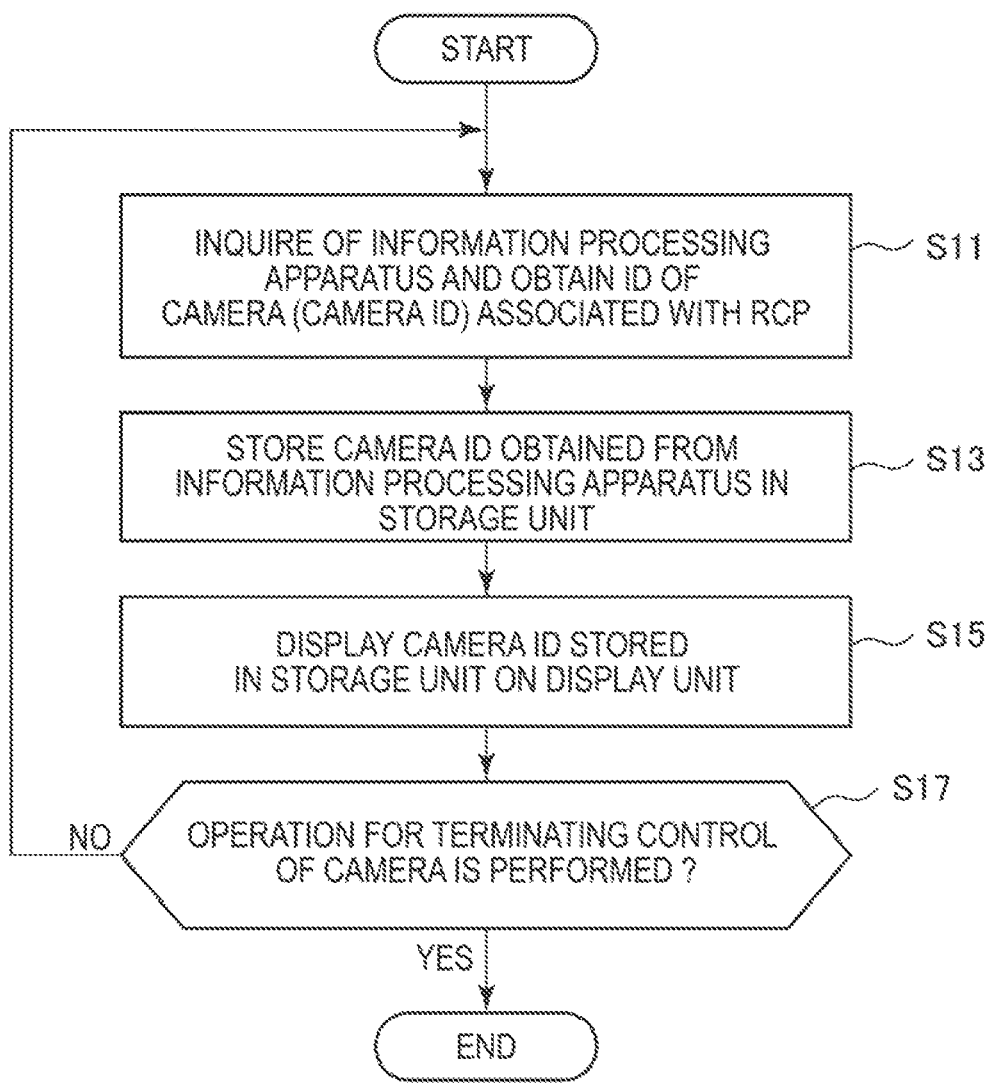
FIG. 8 is a flow chart illustrating an exemplary procedure of a control process in the remote control panel according to the first embodiment of the present disclosure.
Figure 9:
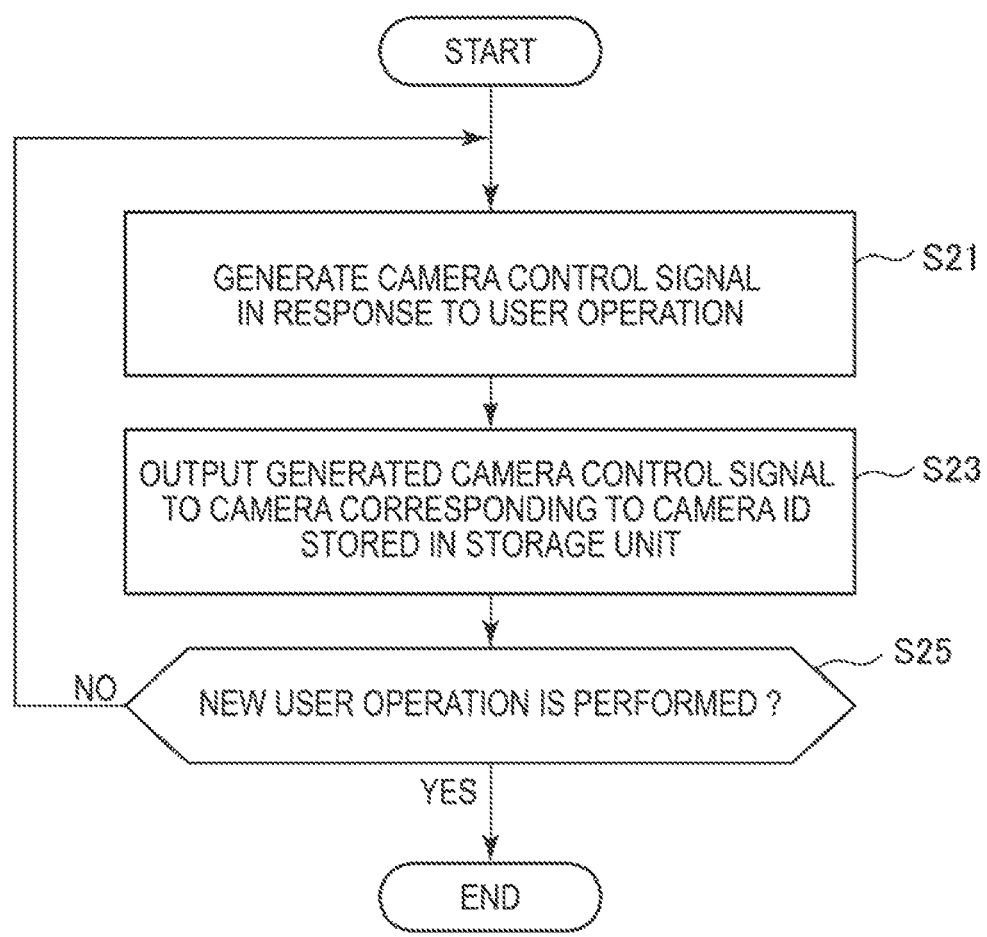
FIG. 9 is a flow chart illustrating an exemplary procedure of a control process in the remote control panel according to the first embodiment of the present disclosure.

Subsequently, referring to FIG. 8 and FIG. 9, an example procedure of a process performed by a remote control panel (RCP) 30 will be briefly described. FIG. 8 and FIG. 9 are flowcharts illustrating an example procedure of a process performed in an RCP.

(Process Flow of RCP in a Steady State)

First, a brief description will be made of an exemplary procedure of a process performed by an RCP in a steady state where a user operation is not performed for the RCP 30.

In a steady state, a camera control unit 301 of the RCP 30 conducts an inquiry of the information processing apparatus 100 or MSU 40 and obtains ID (camera ID) of a camera head associated with the RCP 30 (step S11). The camera control unit 301 then stores the camera ID obtained from the information processing apparatus 100 or MSU 40 in a storage unit 307 which is implemented by a memory, storage device or the like provided in the RCP 30 (step S13). This enables the RCP 30 to specify a destination to transmit a control signal for controlling the camera head.

The camera control unit 301 then requests the display control unit 305 to display the camera ID stored in the storage unit 307 on a display unit (for example, the display panel 39 shown in FIG. 2). The display control unit 305 causes the display unit to display the camera ID stored in the storage unit 307 in response to the request from the camera control unit 301 (step S15). This enables an operator of the RCP 30 to easily know which one of the RCPs can operate which one of the camera heads.

The camera control unit 301 then determines whether or not the user performs an operation for terminating control of the camera (step S17). If it is determined that the user do not perform the operation for terminating control of the camera, then the camera control unit 301 returns the process to step S11 and terminates the process. Alternately, if it is determined that the user performs the operation for terminating control of the camera, the camera control unit 301 terminates the camera control process.

(Process on Performing User Operation)

Next, the process flow of RCP 30 in the case where the user operation is performed for the RCP 30 will be briefly described with reference to FIG. 9.

When any of a variety of buttons 35, knobs 37, or the like provided in the RCP 30 is operated by the user, the user operation information obtaining unit 303 generates user operation information corresponding to the content of user operation and outputs it to the camera control unit 301. The camera control unit 301 generates a camera control signal corresponding to the user operation information based on the user operation information (step S21).

Next, the camera control unit 301 outputs the generated camera control signal to a camera head which is corresponded to the camera ID stored in the storage unit 307 (step S23). By doing so, the control according to the user operation can be performed for a camera head 10 associated with the RCP 30.

Subsequently, the camera control unit 301 determines whether or not a new user operation is performed (step S25). If it is determined that a new user operation is performed for the RCP 30 by the user, then the RCP 30 returns the process to step S21 and continues the control process. On the other hand, if it is determined that a new user operation is not performed for the RCP 30 by the user, the RCP 30 terminates the camera control process.

In this way, there are two kinds of processes for the RCP 30 associated with any one of the camera heads 10. That is, there are processes in the states where the user operation is not performed and where the user operation is performed.

<Information Processing Method>

Figure 10:
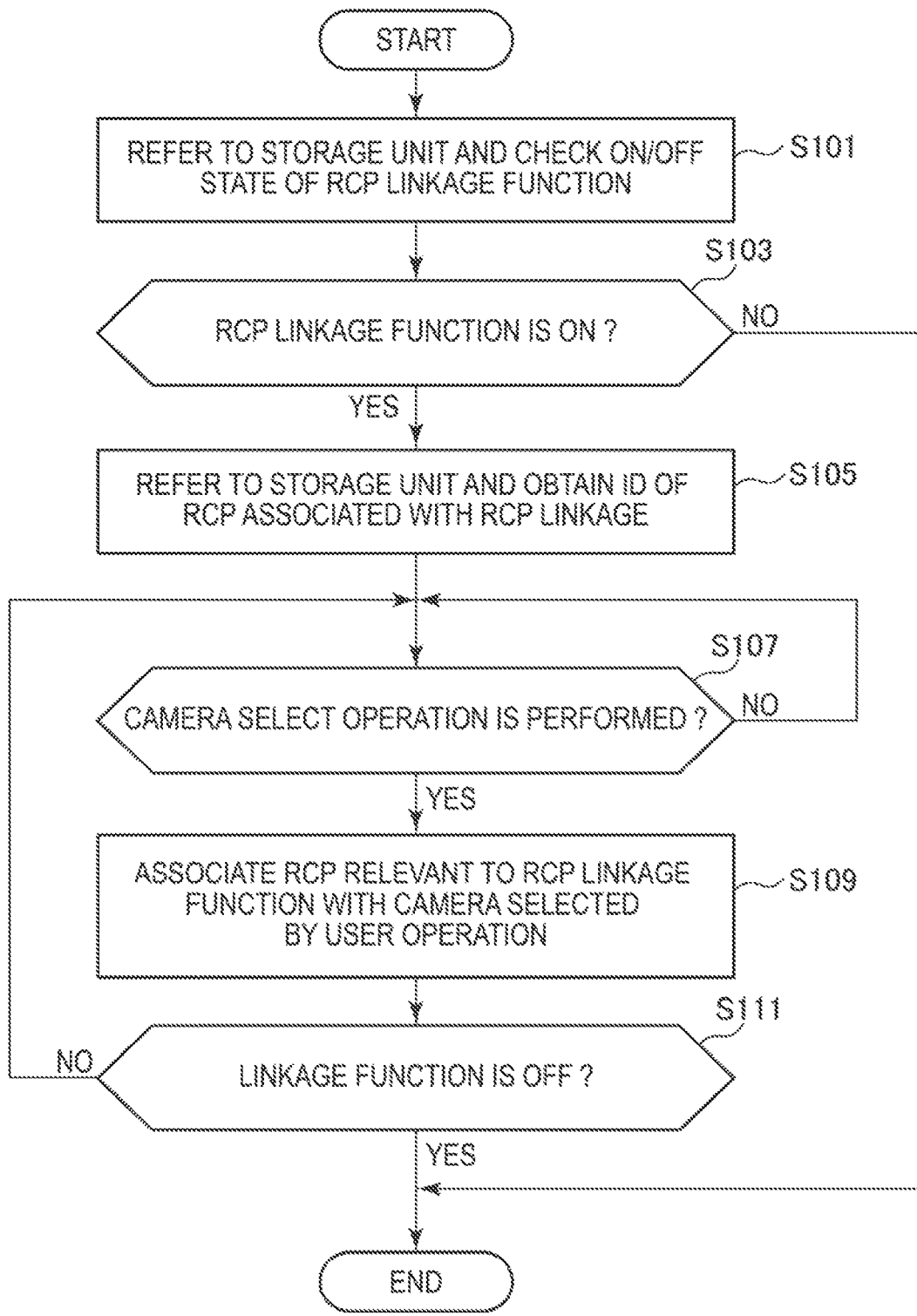
FIG. 10 is a flow chart illustrating an exemplary procedure of an information processing method according to the embodiment of the present disclosure.

Next, referring to FIG. 10, a process of the information processing method (more specifically, a method of correspondence relationship information change process) performed in the information processing apparatus 100 according to the present embodiment will be described. FIG. 10 is a flow chart illustrating an exemplary process of an information processing method according to the present embodiment.

The central control unit 101 of the information processing apparatus 100 refers to, for example, a setting screen state data stored in the storage unit 111 and checks the ON/OFF state of RCP Linkage function (step S101). The central control unit 101 determines the ON/OFF state of RCP Linkage function (step S103). If it is determined that state of RCP Linkage function is OFF, the central control unit 101 terminates the correspondence relationship information change process.

On the other hand, if it is determined that state of RCP Linkage function is ON, the central control unit 101 refers to data such as a camera and RCP setting data stored in the storage unit 111 or the like and obtains identification information (for example, ID number) of the RCP associated with the RCP Linkage function (step S105).

The central control unit 101 determines whether or not a camera select operation is performed by a user (step S107). If it is determined that the camera select operation is performed, the central control unit 101 outputs identification information (for example, ID number) of the camera head selected by the user operation to the correspondence relationship information change unit 109. The correspondence relationship information change unit 109 associates an RCP with a camera head selected by the user operation (step S109). In this case, the RCP is associated with the RCP Linkage function. Also, the association is performed on the basis of the identification information of the camera head selected by the user, and the identification information is outputted from the central control unit 101. More specifically, for example, in the correspondence relationship information shown in FIG. 7, the identification information of a camera head which is correlated with an RCP associated with the RCP Linkage function is changed into the identification information selected by the user operation. This enables a camera head selected by the user operation to be controlled by the RCP associated with the RCP Linkage function.

The central control unit 101 then determines whether or not the RCP Linkage function is OFF (step S111). If it is not determined that the RCP Linkage function is OFF, then the central control unit 101 returns the process to step S107 and continues the process. On the other hand, if it is determined that the RCP Linkage function is OFF, then the central control unit 101 terminates the the process of changing in correspondence relationship information.

By performing the processes as described above, since the correspondence relationship information is changed for an RCP associated with the RCP Linkage function when a user selects a camera head by using the MSU software, the RCP can automatically trace the setting of MSU software, thereby controlling a camera head selected by the user. This enables a single RCP located near the information processing apparatus 100 to control any camera head selected by the camera select function of the MSU software by associating the RCP located near the information processing apparatus 100 with the RCP Linkage function. Therefore, with the information processing apparatus and information processing method according to the present embodiment, it is possible to control a plurality of camera heads without impairing operability, thereby improving user's convenience.

(Hardware Configuration)

Figure 11:
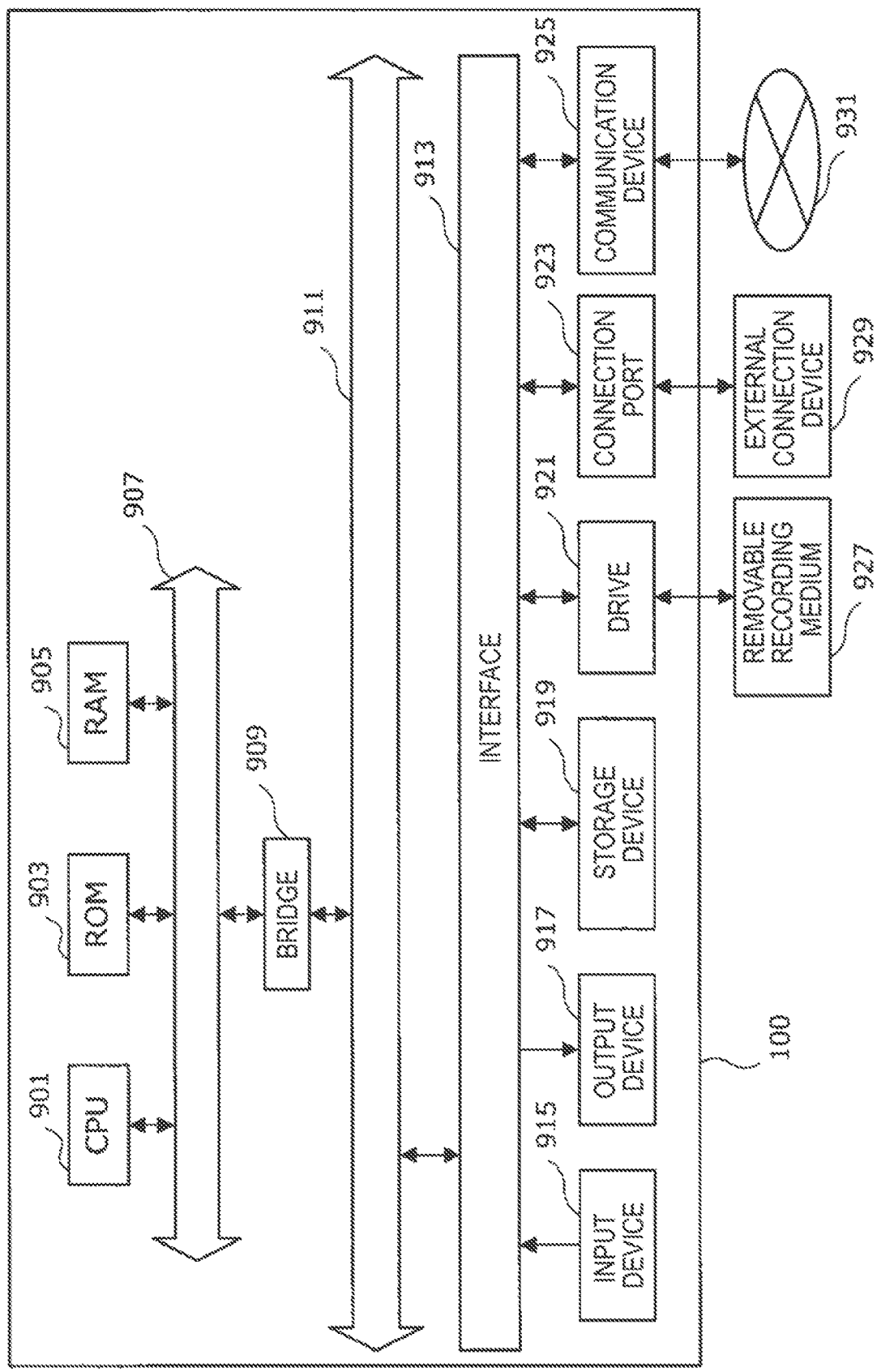
FIG. 11 is a block diagram illustrating an example of the hardware configuration of an information processing apparatus according to the embodiment of the present disclosure.

Next, the hardware configuration of the information processing apparatus 100 according to the embodiment of the present disclosure will be described in detail with reference to FIG. 11. FIG. 11 is a block diagram for illustrating the hardware configuration of the information processing apparatus 100 according to the embodiment of the present disclosure.

The information processing apparatus 100 mainly includes a CPU 901, a ROM 903, and a RAM 905. Furthermore, the information processing apparatus 100 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing apparatus and a control device, and controls the overall operation or a part of the operation of the information processing apparatus 100 according to various programs recorded in the ROM 903, the RAM 905, the storage device 919, or a removable recording medium 927. The ROM 903 stores programs, operation parameters, and the like used by the CPU 901. The RAM 905 primarily stores programs that the CPU 901 uses and parameters and the like varying as appropriate during the execution of the programs. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected device 929 such as a mobile phone or a PDA conforming to the operation of the information processing apparatus 100. Furthermore, the input device 915 generates an input signal based on, for example, information which is input by a user with the above operation means, and is configured from an input control circuit for outputting the input signal to the CPU 901. The user of the information processing apparatus 100 can input various data to the information processing apparatus 100 and can instruct the information processing apparatus 100 to perform processing by operating this input apparatus 915.

The output device 917 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processings performed by the information processing apparatus 100. More specifically, the display device displays, in the form of texts or images, a result obtained by various processes performed by the information processing apparatus 100. On the other hand, the audio output device converts an audio signal such as reproduced audio data and sound data into an analog signal, and outputs the analog signal.

The storage device 919 is a device for storing data configured as an example of a storage unit of the information processing apparatus 100 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various data, and various data obtained from the outside.

The drive 921 is a reader/writer for recording medium, and is embedded in the information processing apparatus 100 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the information processing apparatus 100. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the information processing apparatus 100 directly obtains various data from the externally connected apparatus 929 and provides various data directly to the externally connected apparatus 929.

The communication device 925 is a communication interface configured from, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 is configured from a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing apparatus 100 according to the embodiment of the present disclosure has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

Moreover, the hardware configurations of the remote control panel 20, the camera control unit 30, and the master setup unit 40 according to the embodiments of the present disclosure are similar to the hardware configuration of the information processing apparatus 100 according to the embodiments of the present disclosure, the effects capable of being obtained from their hardware configuration are similar to each other, hence the details are omitted herein.

It should be understood by those skilled in the art that various modifications, combinations, sub-combinations and alterations may occur depending on design requirements and other factors insofar as they are within the scope of the appended claims or the equivalents thereof.

Additionally, the following configurations are also within the technological scope of the present disclosure.

(1)

An information processing apparatus including:

a correspondence relationship information change unit for changing a correspondence relationship information indicating each correspondence relationship between a plurality of image pickup devices and a plurality of controllers, the image pickup devices and the controllers being associated with each other, the controller being used to operate at least one of the plurality of image pickup devices, and the controller being capable of operating the image pickup device associated with the controller.

(2)

The information processing apparatus according to (1), wherein the correspondence relationship information change unit changes the image pickup device associated with a predetermined controller by the correspondence relationship information in response to a user operation.

(3)

The information processing apparatus according to (1) or (2), wherein the plurality of image pickup devices are image pickup devices used for broadcasting.

(4)

The information processing apparatus according to (2) or (3), wherein the correspondence relationship information change unit changes content of a database in which the correspondence relationship information is described, in response to a user operation.

(5)

The information processing apparatus according to any of (1) to (4), further including:

a control unit for directly controlling the image pickup device and the controller.

(6)

The information processing apparatus according to any of (1) to (5), wherein the controller controls at least one of a state of iris and a color balance in the image pickup device associated with the controller in the correspondence relationship information.

(7)

An information processing method including:

changing correspondence relationship information indicating each correspondence relationship between a plurality of image pickup devices and a plurality of controllers, the image pickup devices and the controllers being associated with each other, the controller being used to operate at least one of the plurality of image pickup devices, and the controller being capable of operating the image pickup device associated with the controller.

(8)

A program for causing a computer to realize:

a correspondence relationship information change function for changing correspondence relationship information indicating each correspondence relationship between a plurality of image pickup devices and a plurality of controllers, the image pickup devices and the controllers being associated with each other, the controller being used to operate at least one of the plurality of image pickup devices, and the controller being capable of operating the image pickup device associated with the controller.

(9)

An information processing system including:

a plurality of image pickup devices;

a plurality of controllers for operating at least one of the plurality of image pickup devices; and an information processing apparatus including a correspondence relationship information change unit for changing correspondence relationship information indicating each correspondence relationship between the image pickup devices and the controllers, the image pickup devices and the controllers being associated with each other, and the controller being capable of operating the image pickup device associated with the controller.

What is claimed is:

1. A non-transitory computer-readable medium having stored thereon, computer-executable instructions which, when executed by a computer, cause the computer to execute operations, the operations comprising:

transmitting list information for display of a plurality of cameras on a display device;

receive a selection of at least one camera from the plurality of cameras based on the transmitted list information;

controlling transmission of image data generated by the selected at least one camera;

transmitting correspondence relationship information, the correspondence relationship information being for display, on the display device, of a correspondence relationship between the plurality of the cameras and a plurality of controllers; and changing the correspondence relationship between one of the plurality of the cameras and one of the plurality of controllers based on the transmitted correspondence relationship information.

2. The non-transitory computer-readable medium according to claim 1, the operations further comprising:

generating a control signal to control an operational setting of the selected at least one camera;

transmitting, to the selected at least one camera, the generated control signal to remotely control the operational setting of the selected at least one camera; and transmitting transmission information corresponding to the selected at least one camera.

3. The non-transitory computer-readable medium according to claim 1, the operations further comprising:

transmitting setting information of the selected at least one camera for concurrent display with the list information on the display device.

4. The non-transitory computer-readable medium according to claim 1, the operations further comprising:

transmitting parameters of each camera of the plurality of the cameras and transmission states of each camera of the plurality of the cameras for display on the display device.

5. The non-transitory computer-readable medium according to claim 1, wherein each camera of the plurality of cameras is configured to communicate with a corresponding controller of the plurality of controllers based on the correspondence relationship information.

6. The non-transitory computer-readable medium according to claim 5, wherein each camera of the plurality of cameras is further configured to wirelessly communicate with the corresponding controller of the plurality of controllers based on an Internet Protocol.

7. The non-transitory computer-readable medium according to claim 1, the operations further comprising:

managing a first file that is associated with the selected at least one camera, wherein the first file is different from a second file which includes the image data.

8. The non-transitory computer-readable medium according to claim 1, the operations further comprising:

converting the image data into a file with a file format.

9. The non-transitory computer-readable medium according to claim 1, wherein the plurality of the cameras is configured to broadcast data.

10. The non-transitory computer-readable medium according to claim 1, the operations further comprising:

transmitting a model name of the selected at least one camera for display on the display device.

11. The non-transitory computer-readable medium according to claim 1, the operations further comprising:

changing the correspondence relationship based on a user input.

12. The non-transitory computer-readable medium according to claim 1, wherein the correspondence relationship represents which of the plurality of controllers is permitted to control a particular one of the plurality of cameras.

13. An information processing method, comprising:

transmitting list information for display of a plurality of cameras on a display device;

receive a selection of at least one camera from the plurality of cameras based on the transmitted list information;

controlling transmission of image data generated by the selected at least one camera;

transmitting correspondence relationship information, the correspondence relationship information being for display, on the display device, of a correspondence relationship between the plurality of the cameras and a plurality of controllers; and changing the correspondence relationship between one of the plurality of the cameras and one of the plurality of controllers based on the transmitted correspondence relationship information.

14. The information processing method according to claim 13, further comprising:

generating a control signal to control an operational setting of the selected at least one camera;

transmitting, to the selected at least one camera, the generated control signal to remotely control the operational setting of the selected at least one camera; and transmitting transmission information corresponding to the selected at least one camera.

15. The information processing method according to claim 13, further comprising:

transmitting setting information of the selected at least one camera for concurrent display with the list information on the display device.

16. The information processing method according to claim 13, further comprising:

transmitting parameters of each camera of the plurality of the cameras and transmission states of each camera of the plurality of the cameras for display on the display device.

17. The information processing method according to claim 13, wherein each camera of the plurality of cameras is configured to communicate with a corresponding controller of the plurality of controllers based on the correspondence relationship information.

18. The information processing method according to claim 17, wherein each camera of the plurality of cameras is further configured to wirelessly communicate with the corresponding controller of the plurality of controllers based on an Internet Protocol.

19. The information processing method according to claim 13, further comprising:

managing a first file that is associated with the selected at least one camera, wherein the first file is different from a second file which includes the image data.

20. The information processing method according to claim 13, further comprising:

converting the image data into a file with a file format.

21. The information processing method according to claim 13, wherein the plurality of the cameras are configured to broadcast data.

22. The information processing method according to claim 13, further comprising:

transmitting a model name of the selected at least one camera for display on the display device.

23. The information processing method according to claim 13, further comprising:

changing the correspondence relationship based on a user input.

24. An information processing apparatus, comprising:
circuitry configured to:
- transmit list information for display of a plurality of cameras on a display device;
- receive a selection of at least one camera from the plurality of cameras based on the transmitted list information;
- control transmission of image data generated by the selected at least one camera;
- transmit correspondence relationship information, the correspondence relationship information being for display, on the display device, of a correspondence relationship between the plurality of the cameras and a plurality of controllers; and
- change the correspondence relationship between one of the plurality of the cameras and one of the plurality of controllers based on the transmitted correspondence relationship information.

25. The information processing apparatus according to claim 24, wherein the circuitry is configured to:
- generate a control signal to control an operational setting of the selected at least one camera;
- transmit, to the selected at least one camera, the generated control signal to remotely control the operational setting of the selected at least one camera; and
- transmit transmission information corresponding to the selected at least one camera.

* * * * *